(12) United States Patent
Rodolfo et al.

(10) Patent No.: US 11,980,140 B2
(45) Date of Patent: May 14, 2024

(54) NON-POTABLE CONVERSION INDICATOR AND IRRIGATION DEVICE

(71) Applicant: Rain Bird Corporation, Azusa, CA (US)

(72) Inventors: Saul Le-Garcia Rodolfo, Tucson, AZ (US); Michael A. McAfee, Tucson, AZ (US); Jeffrey Glenn Johnson, Oro Valley, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 17/669,103

(22) Filed: Feb. 10, 2022

(65) Prior Publication Data

US 2023/0247948 A1 Aug. 10, 2023

(51) Int. Cl.
*A01G 25/02* (2006.01)
*A01G 25/16* (2006.01)

(52) U.S. Cl.
CPC ......... *A01G 25/023* (2013.01); *A01G 25/165* (2013.01)

(58) Field of Classification Search
CPC .............................. A01G 25/023; A01G 25/165
See application file for complete search history.

(56) References Cited

U.S. PATENT DOCUMENTS

| | | | |
|---|---|---|---|
| 4,702,275 A * | 10/1987 | Ballun | E03B 9/12 137/382.5 |
| 5,299,742 A | 4/1994 | Han | |
| 5,383,600 A | 1/1995 | Verbera | |
| 5,718,549 A | 2/1998 | Noda | |
| 5,769,731 A * | 6/1998 | Reimer | A63B 57/505 473/150 |
| 5,868,316 A | 2/1999 | Scott | |
| 6,234,411 B1 | 5/2001 | Walker | |
| 6,237,970 B1 | 5/2001 | Joannou | |
| 6,622,933 B1 * | 9/2003 | Young | A01G 25/02 239/69 |
| D486,886 S | 2/2004 | Gregory | |
| D502,758 S | 3/2005 | Gomez | |
| 7,374,496 B2 | 5/2008 | Grant | |
| 7,644,870 B2 | 1/2010 | Alexander | |
| D669,964 S | 10/2012 | Arkalgud | |
| D678,466 S | 3/2013 | Arkalgud | |
| D708,300 S | 7/2014 | Kah, Jr. | |
| D844,117 S | 3/2019 | Kennison | |

OTHER PUBLICATIONS

Rain Bird Corporation, Falcon 6504 Rotor Installation and Operating Guide, Apr. 2000, 4 pages.
Rain Bird Corporation, Technical Specification for Falcon 6504 Rotors, May 2012, 5 pages.

* cited by examiner

*Primary Examiner* — Chad G Erdman
(74) *Attorney, Agent, or Firm* — Fitch, Even, Tabin & Flannery, LLP

(57) ABSTRACT

An irrigation device is provided with an indicator that may be converted to indicate a condition, such as use with non-potable fluid. The irrigation device includes an inlet, and outlet, and a body defining a flow path from the inlet to the outlet. It further includes a cover with a removable section, and an indicator at least partially under the removable cover. The indicia indicate a condition of the irrigation device, such as being used with non-potable fluid. In one state, the cover is intact and the indicia are not exposed. In another state, the removable section has been removed and the indicia are at least partially exposed.

22 Claims, 18 Drawing Sheets

NON-POTABLE CONVERSION INDICATOR AND IRRIGATION DEVICE

FIELD

This invention relates generally to irrigation devices and, more particularly, to conversion indicators to show irrigation devices that are intended to indicate a condition of the irrigation device.

BACKGROUND

Irrigation devices are generally used to deliver water or fluid to desired terrain or areas. In one aspect, there are two types of irrigation products: one type that is intended for use with potable water and another type that is intended for use with or that may use non-potable water. Non-potable water (water that is not of drinking water quality) may include water from a variety of sources, including, for example, water harvested from air-conditioning condensate, rainwater, stormwater runoff, and treated/reclaimed/recycled water. Irrigation products using non-potable water may be suitable for certain irrigation purposes and may be an approach that provides some value to non-potable water that might not otherwise have utility.

Given the nature of non-potable water, irrigation devices using non-potable water must include indicia indicating that the water is not suitable for consumption. Non-potable versions of irrigation products are labeled and color-coded (often with the color purple) pursuant to the local code and regulation of the locale where the irrigation device is to be installed. It is desirable to convert a standard irrigation device (such as, for example, an irrigation rotor) to a non-potable version without completely removing the installed device and exchanging it for a labeled non-potable version. Such irrigation devices are often installed underground, which means that conversion may be labor-intensive and inconvenient. Further, irrigation product manufacturers may be required to produce two separate products/versions, which may create inventory challenges.

It is desirable to develop an approach where an irrigation device can be readily converted from a standard, potable version to a non-potable version. In one aspect, there is a need for a solution that will allow for an installed irrigation device (such as, for example, an irrigation rotor) to be converted to a non-potable version without having to completely remove the entire device, which may be installed in the ground. There is also a need for a single SKU (or stock keeping unit) that can be produced by irrigation product manufacturers without the need to manufacture separate potable and non-potable versions.

DESCRIPTION OF THE PREFERRED EMBODIMENTS

With respect to FIGS. 1-6, an irrigation device in the form of a rotor 10 is shown that includes an indicator that can be changed to indicate a condition for the rotor. In one form, the indicator may identify the rotor 10 being used with potable water. In another form, however, the indicator may be converted to identify the rotor 10 being used with non-potable water, such as, for example, water harvested from air-conditioning condensate, rainwater, stormwater runoff, or that has been otherwise treated, reclaimed, or recycled. Thus, in one aspect, one model or SKU may be provided to an installer of irrigation devices, who may then convert it for non-potable use, as appropriate. The use of the indicator is illustrated with a rotor but may be used with any other type of irrigation device, including, but not limited to, spray, micro-spray, and drip irrigation devices, and it may be used to indicate conditions other than potable/non-potable use.

Figure 1:
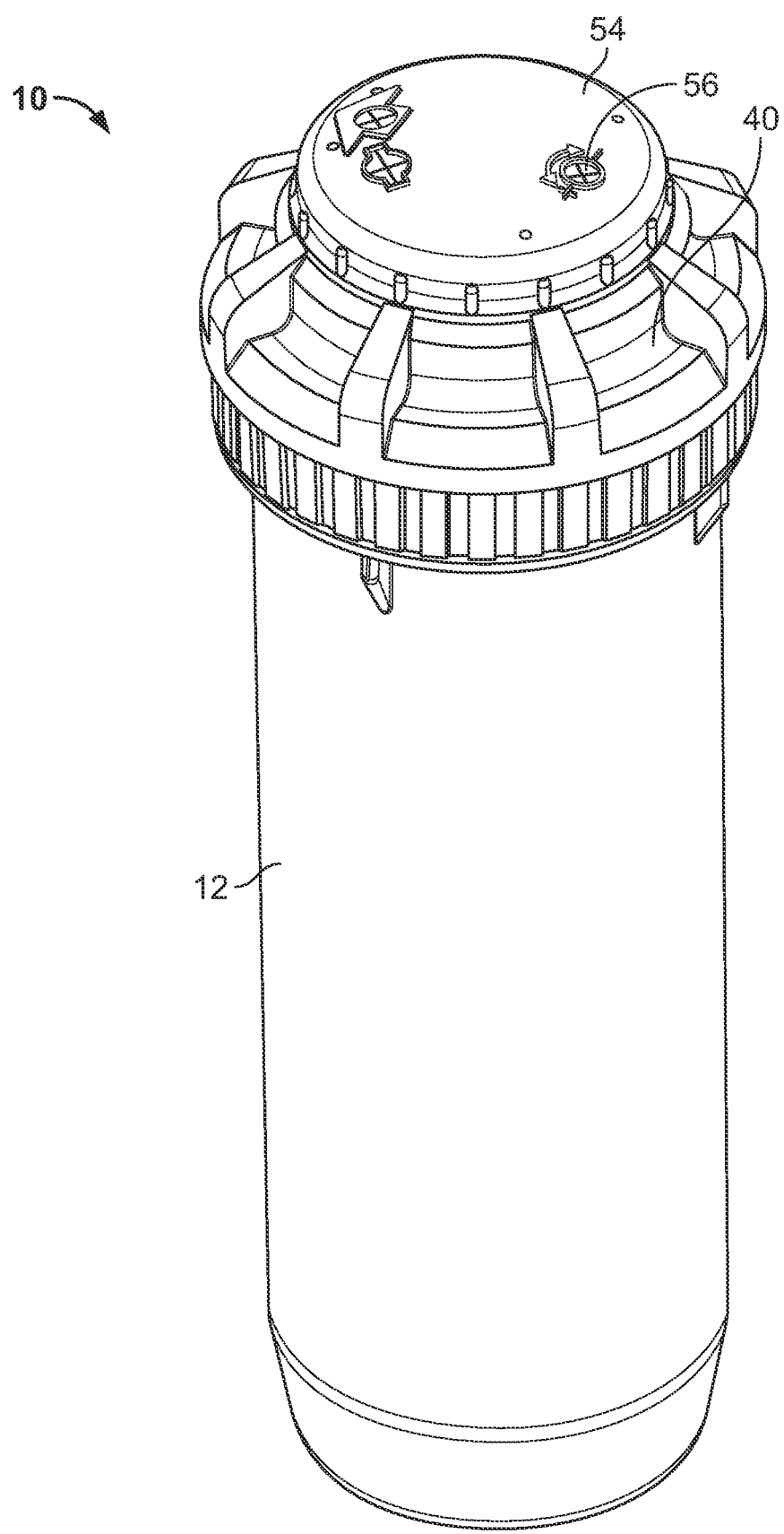
FIG. 1 is a perspective view of an embodiment of a rotor in a retracted position embodying features of the present invention and with the non-potable indicator hidden.
Figure 2:
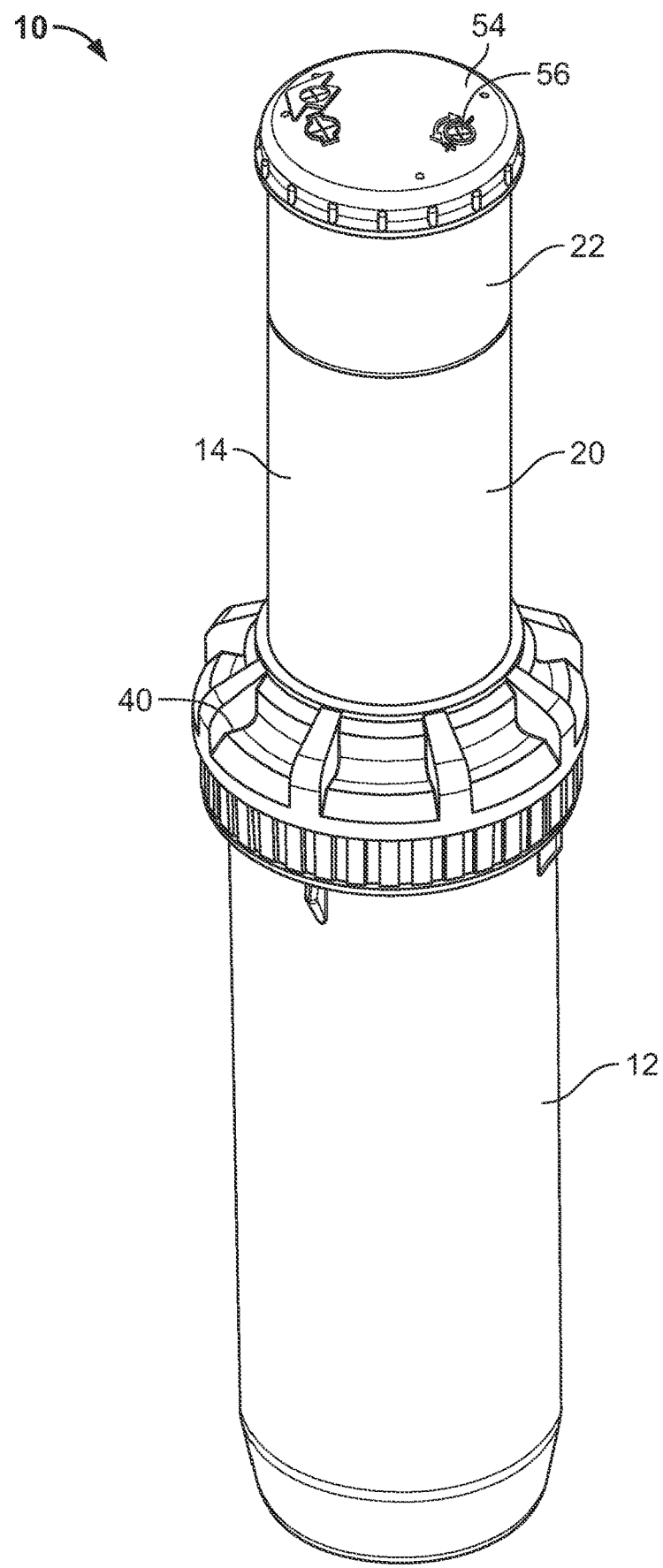
FIG. 2 is a perspective view of the rotor of FIG. 1 in an elevated, pop-up position.

The rotor 10 preferably includes a housing (or case) 12 and a riser assembly 14, which generally form the body of the rotor 10. The riser assembly 14 travels cyclically between a spring-retracted position, as shown in FIG. 1, and an elevated spraying position, as shown in FIG. 2, in response to water pressure. More specifically, when the supply water is on, i.e., pressurized for a watering cycle, the riser assembly 14 extends ("pops up") above ground level so that water can be distributed to the terrain for irrigation.

When the water is shut off at the end of a watering cycle, the riser assembly 14 retracts into the housing 12 where it is protected from damage.

The housing 12 provides a protective covering for the riser assembly 14 and serves as a conduit for incoming water under pressure. The housing 12 preferably has the general shape of a cylindrical tube and is preferably made of a sturdy lightweight injection molded plastic or similar material. The housing 12 preferably has a lower end with an inlet 18 that is threaded to connect to a correspondingly threaded outlet of a water supply pipe (not shown).

The riser assembly 14 preferably includes a non-rotatable stem (or sleeve) 20 with a lower end and an upper end. A rotatable turret 22 is mounted at the upper end of the stem 20. The turret 22 rotates to water a predetermined arcuate pattern manually adjustable between a minimum and maximum arc of coverage, such as, for example, from a minimum of 40 degrees of coverage to a maximum of 360 degrees of coverage. A plug nozzle 23 cooperates with one or more nozzle inserts 84 for discharging fluid from the turret 22. An arc adjustment member 32 allows an individual to manually adjust the arcuate sweep settings, as described further below.

The stem 20 is generally in the form of an elongated hollow tube, which is preferably made of a lightweight molded plastic or similar material. The lower end includes a radially projecting annular flange 24. The flange 24 preferably includes a plurality of circumferentially spaced grooves 42 that cooperate with internal ribs 44 of the housing 12 to prevent the stem assembly 20 from rotating relative to the housing 12. A coil spring 30 for retracting the riser assembly 14 is disposed in the housing 12 about the outside surface 34 of the riser assembly 14. The spring 30 has a bottom coil 28 that engages the flange 24 and an upper coil 36 seated against the inside of a spring support 52.

The housing cover 40 serves to minimize the introduction of dirt and other debris into the housing 12. The housing cover 40 preferably has internal threads and is mounted to an upper end of the housing 12 which has corresponding threads. The housing cover 40 also preferably includes a grippable external surface that preferably includes a plurality of vertically extending ribs 48 for enhanced gripping and easy mounting of the rotor 10 to a water supply pipe outlet.

The housing cover 40 is fitted with a seal 50, preferably a ring-shaped wiper seal, mounted on the inside of the cover 40. More specifically, the support ring 52 seats the wiper seal 50 against the inside of the housing cover 40. The wiper seal 50 preferably has an annular lip 51 that slidably engages the outside of the riser assembly 14, as it reciprocates in and out of the housing 12 to wipe the outside of the riser assembly 14. This wiping action minimizes the amount of debris entering the housing 12 through the space between the housing 12 and the riser assembly 14 and on the surface of the riser assembly 14.

Figure 6:
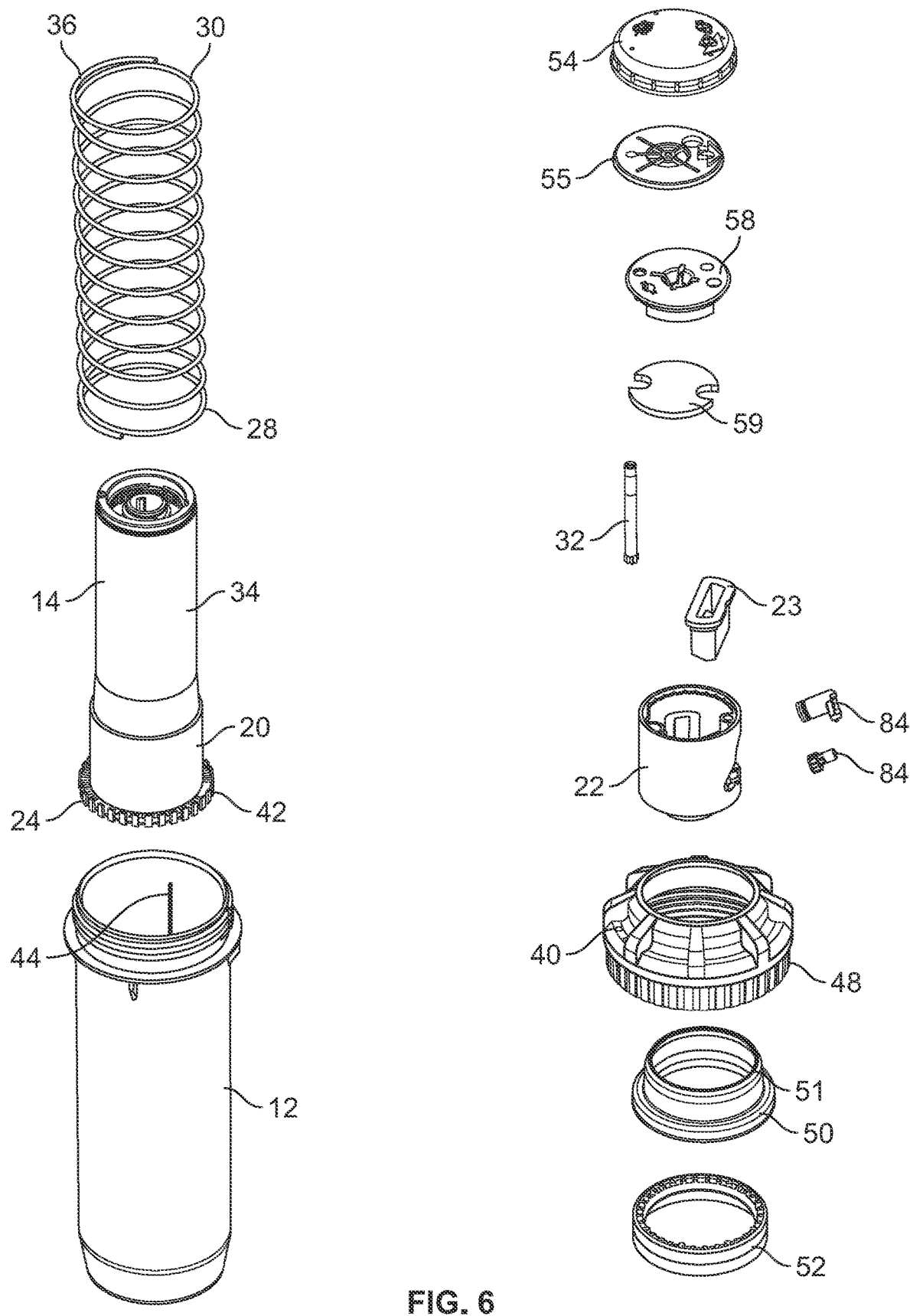
FIG. 6 is an exploded view of some of the components of the rotor of FIG. 1.

A rotor cover 54, preferably made of rubber or some other elastomer material, such as thermoplastic elastomer (TPE), is mounted atop the turret 22 to enclose the top of the rotor 10 and provide protection on athletic fields and to eliminate any exposed sharp edges. The rotor cover 54 includes protective access ports formed by slits or slots 56 disposed in the top of the turret 22 (FIG. 2) to enable insertion of a hand tool for manual control of various control features of the rotor 10 and to help keep debris out of the hand tool slot 96 on the arc adjustment member 32. The rotor cover 54 also reduces accumulation of particles and other debris in the top of the turret 22. An insert 55 disposed at least partially within the rotor cover 54 is shown in FIG. 6. The rotor cover 54 and insert 55 are described in further detail below.

As shown in FIG. 6, the rotor 10 also preferably includes a turret cap 58 and a foam insert 59 disposed beneath the rotor cover 54. The turret cap 58 defines a number of holes 110 (FIGS. 10 and 11) to seat and support the slotted free ends of screws or shafts for the manual control of various rotor features, such as, without limitation, radius reduction/adjustment and arc adjustment. For example, a passage 62 for a radius reduction screw extends downward from one of the holes 110 and into the turret 22. The radius reduction screw may be used to secure a nozzle insert 84 and to adjust the throw radius of the rotor 10. The arc adjustment member 32 is preferably seated in one of the holes 110 of the turret cap 58 to support manual control of the arc through which water is distributed by the rotatable turret 22.

Various control features (such as, for example, radius reduction and arc adjustment) have been described above. It should be understood, however, that these are simply examples and are not intended as limitations on the rotor or other irrigation device. In certain forms, it is contemplated that a limited number of features may be incorporated into the irrigation device, as desired. Further, in other forms, additional or different features may be utilized in the irrigation device.

Figure 3:
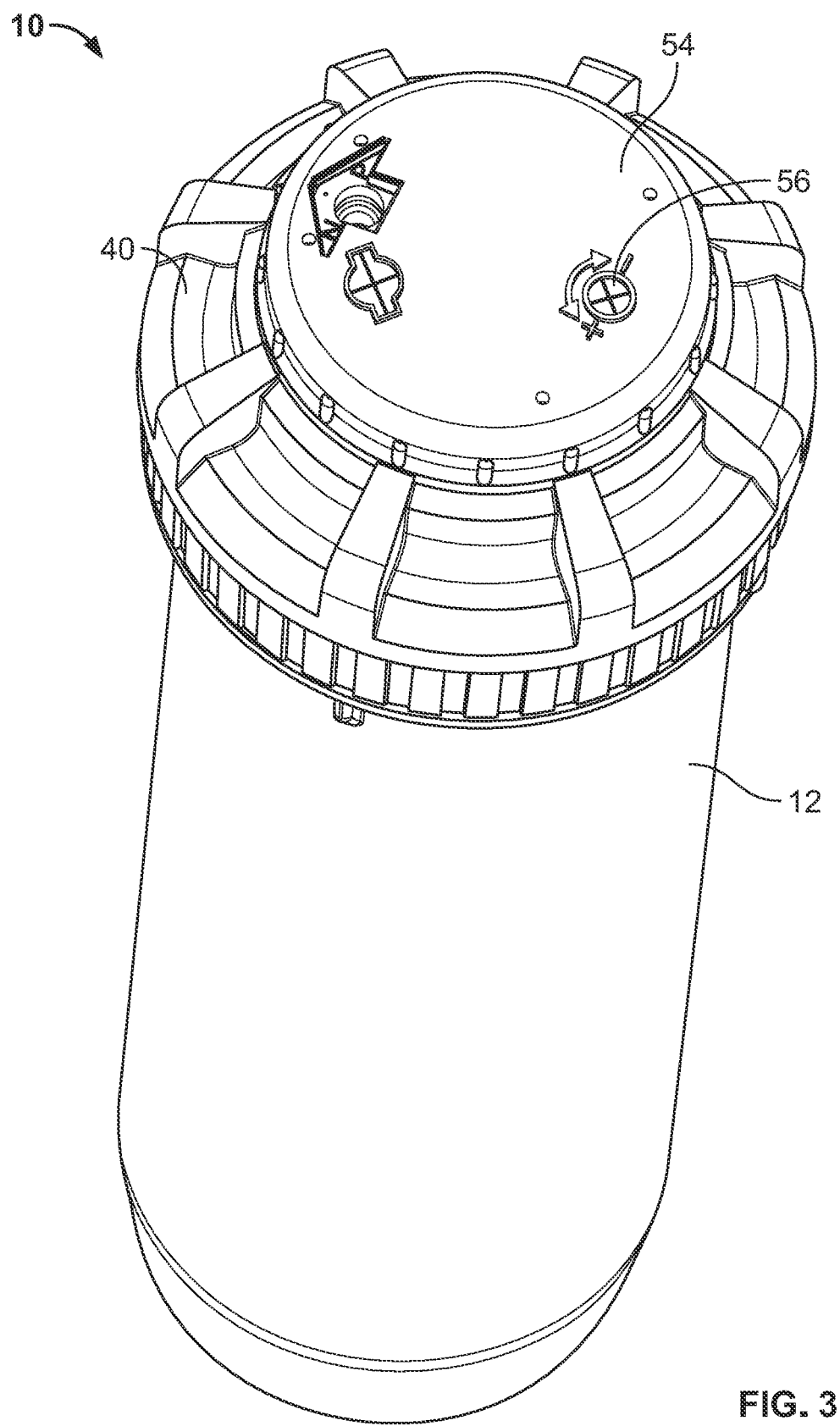
FIG. 3 is a perspective view of the rotor of FIG. 1 in the retracted position but with the non-potable indicator displayed.
Figure 4:
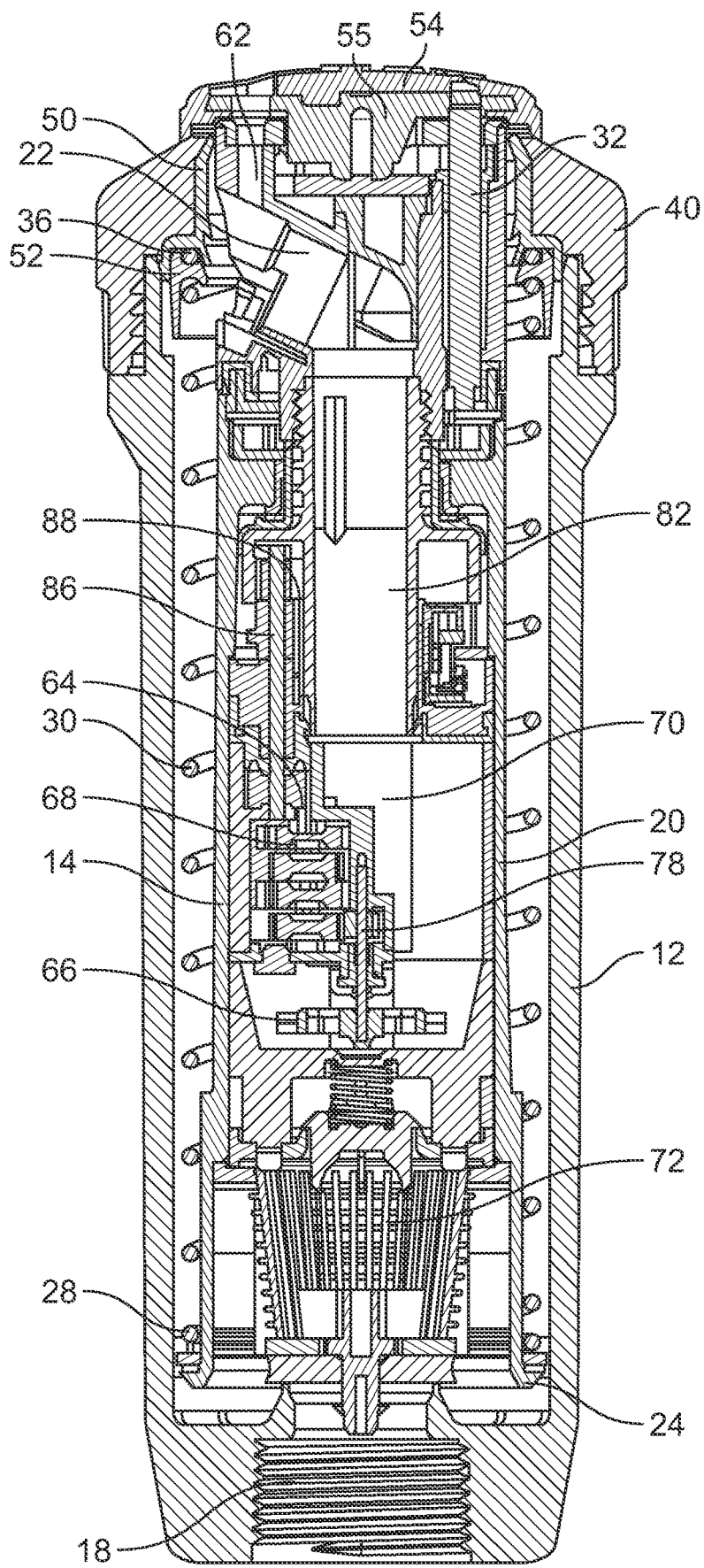
FIG. 4 is a cross-sectional view of the rotor of FIG. 1 in the retracted position.
Figure 5:
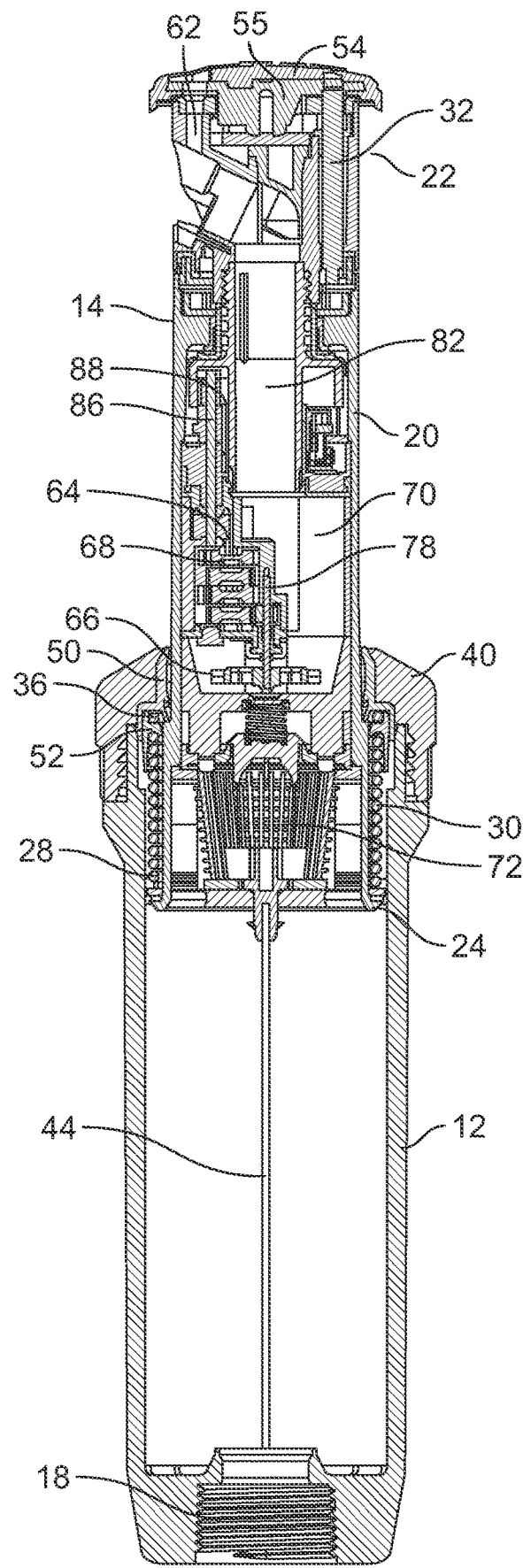
FIG. 5 is a cross-sectional view of the rotor of FIG. 1 in the extended, pop-up position.

As shown in FIGS. 3-5, a drive assembly 64 is mounted in the stem 20 and rotates the turret 22. Water under pressure supplied to the sprinkler housing 12 preferably provides the power for rotatably driving the turret 22, although numerous other conventional ways of providing power to the turret 22 may be used. The drive assembly 64 preferably includes a water-driven turbine 66 and a gear reduction assembly 68, which are operatively coupled to rotate the turret 22.

When the riser assembly 14 is in the elevated spray position, water flows into the stem assembly 20 and causes the turret 22 to rotate, and the flow path from the inlet to the outlet of the irrigation device is described as follows. Water enters the housing 12 through the inlet 18 and passes through the housing 12 to the riser assembly 14. The water passes through a filter 72 mounted within the lower end of the stem 20. The filter 72 prevents grit and other debris from flowing through the riser assembly 14 to enter the riser assembly 14 and possibly causing damage to sensitive sprinkler components downstream of the riser inlet.

Water flows past the filter 72 to rotatably drive the turbine 66, which rotates at a high rate of speed. In turn, the turbine 66 is connected to an axle 78, which, in turn, is coupled to a series of reduction gears of the gear reduction assembly 68. The gear reduction assembly 68 operatively couples the turbine 66 to the turret 22 and reduces the rotation so that the turret 22 rotates at a lower rate of speed. In general, the gear reduction assembly 68 reduces the relatively high-speed rotation of the water-driven turbine 66 to a relatively low rotational speed suitable for rotational driving of the turret 22 to provide proper irrigation.

After flowing past the turbine 66, water continues to flow through flow passage 70 and into the turret 22 through the gear ring 82. As shown in FIGS. 2-5, the turret 22 is supported by the gear ring 82 extending from the gear reduction assembly 68 into the turret 22. The reduction assembly 68 drivingly engages the lower end of a main drive shaft 86 of a reversing gear drive mechanism 88. The rotor 10 preferably includes a reversing gear drive mechanism 88 that switches the direction of rotation of the turret 22 to create the desired arcuate sweep. The upper end of the drive shaft 86 is engaged to the gear ring 82, which is fixedly attached to the turret 22 so that the turret 22 rotates with the main drive shaft 86. The gear ring 82 is hollow and provides a conduit for water to be delivered from the flow passage 70 to the nozzle insert(s) 84 (which serve as outlet(s)) to be discharged for irrigation.

It should be understood that the rotor 10 described above is just one example of a rotor or other irrigation device that may utilize a non-potable conversion indicator. Other rotors are shown in U.S. Pat. Nos. 5,299,742; 5,383,600; and 7,644,870; which are incorporated herein by reference in their entirety. Further, in certain forms, it is contemplated that other types of irrigation devices may utilize a non-potable conversion indicator.

Figure 7:
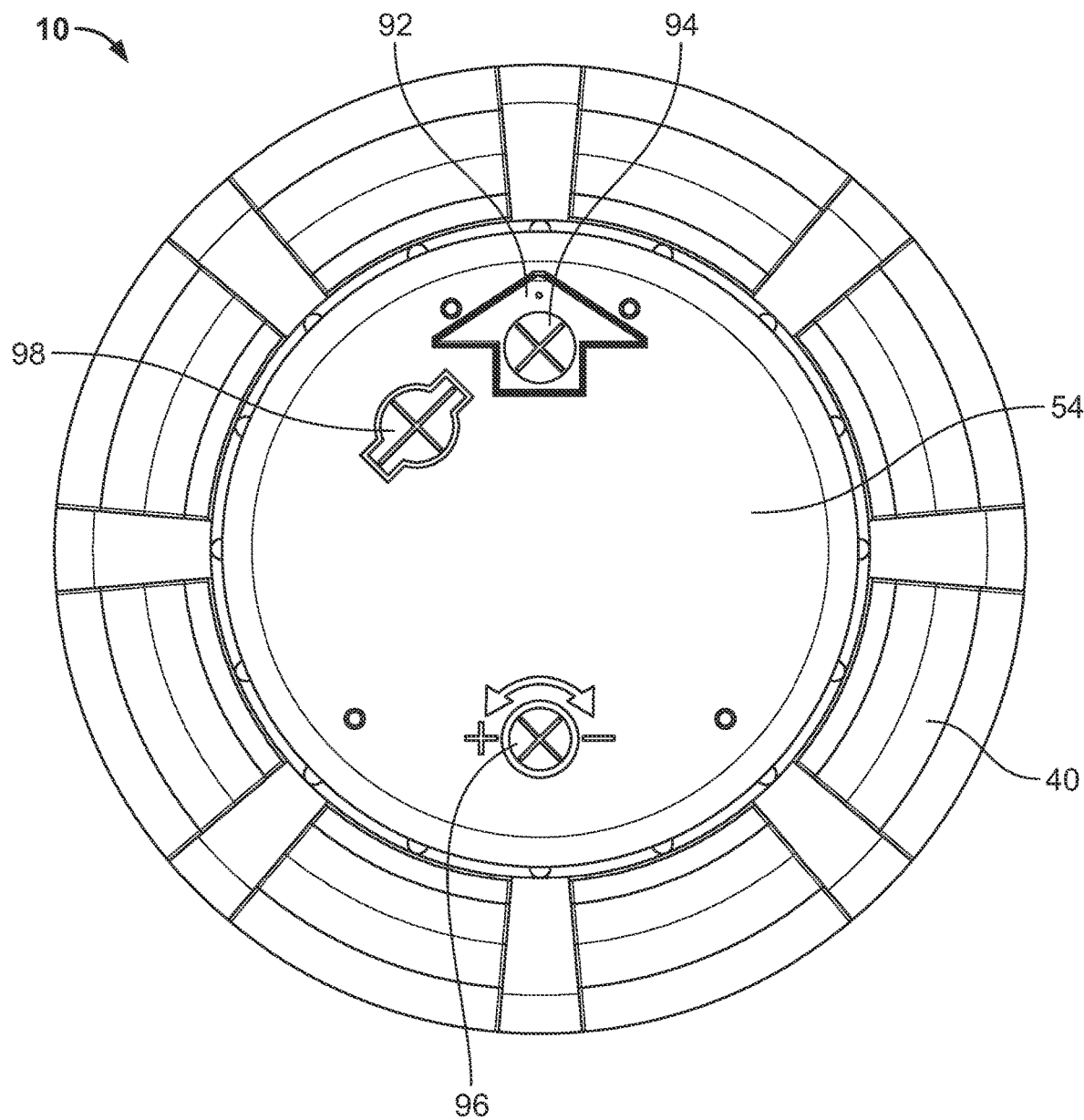
FIG. 7 is a top view of the rotor of FIG. 1 with the non-potable indicator hidden.

FIGS. 7-11 show the top portion of the rotor 10 and certain components of the rotor 10. FIG. 7 shows a top view of the rotor 10 in which the non-potable conversion indicator is not displayed, i.e., is hidden. The rotor cover 54 is disposed on an external portion of the body of the irrigation device and includes a removable section 92. In this particular form, the rotor cover 54 includes a thin, arrow-shaped section 92 that can be torn away to expose the insert 55. Further, as addressed below, the insert 55 is embedded at least partially within the cover 54 and includes indicia indicating intended use of the irrigation device with non-potable fluid.

Also, as can be seen, the rotor cover 54 includes various slots 56 that allow actuation of features of the rotor 10. In this example, the rotor 10 includes a radius reduction (or adjustment) slot 94, an arc adjustment slot 96, and a pull up slot 98. An individual can use a tool to adjust the radius of throw of the rotor 10, to adjust the arc of coverage of the rotor 10, and/or to install a nozzle insert 84. In this particular form, the arrow-shaped section 92 has been located in an area of the cover 54 so as to encompass the radius adjustment slot 94. As should be understood, the section 92 may be any of various shapes (it need not be arrow-shaped). The arrow corresponds to the direction of water discharge from the rotor 10.

Figure 8:
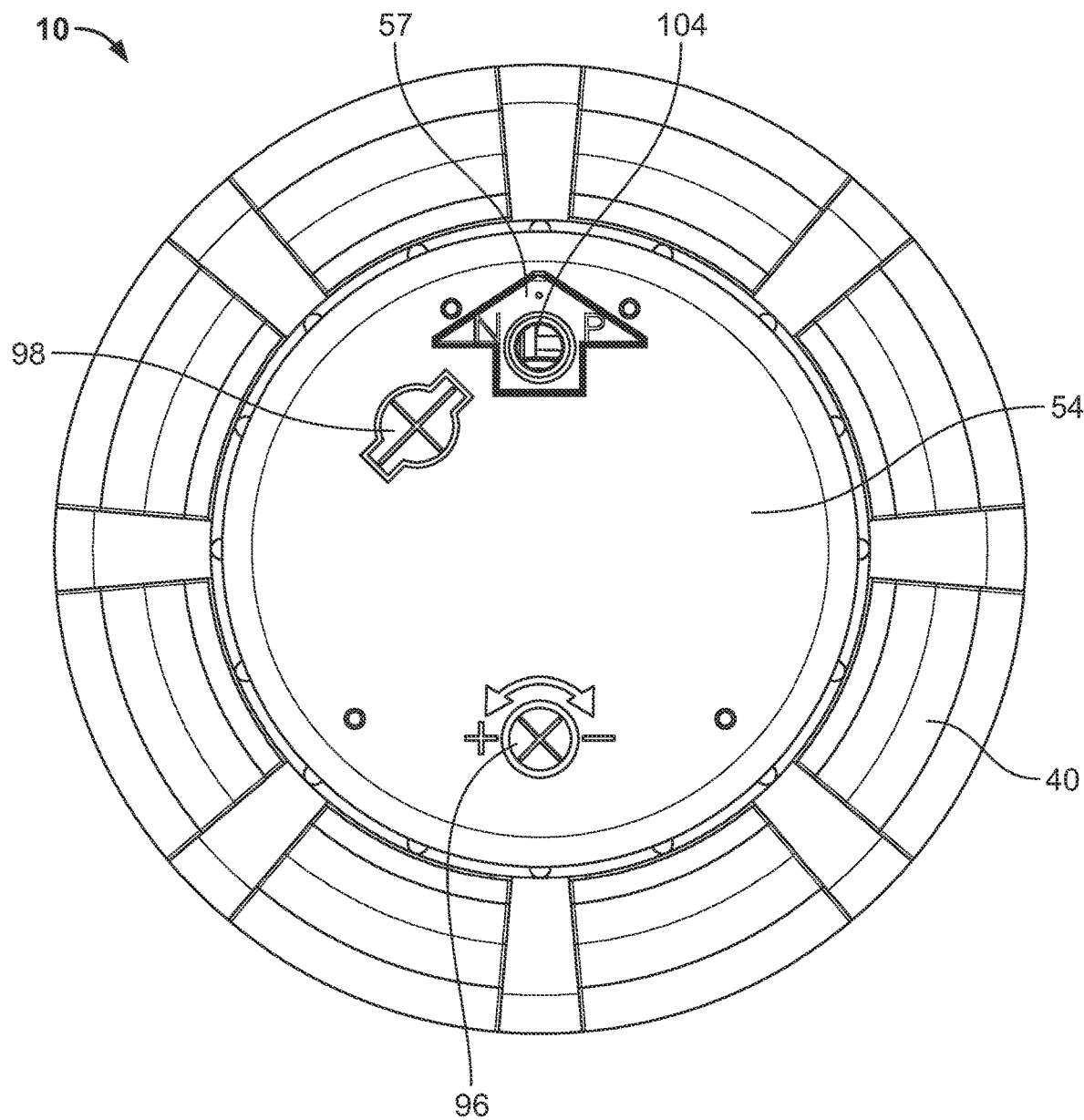
FIG. 8 is a top view of the rotor of FIG. 1 with the non-potable indicator displayed.
Figure 9:
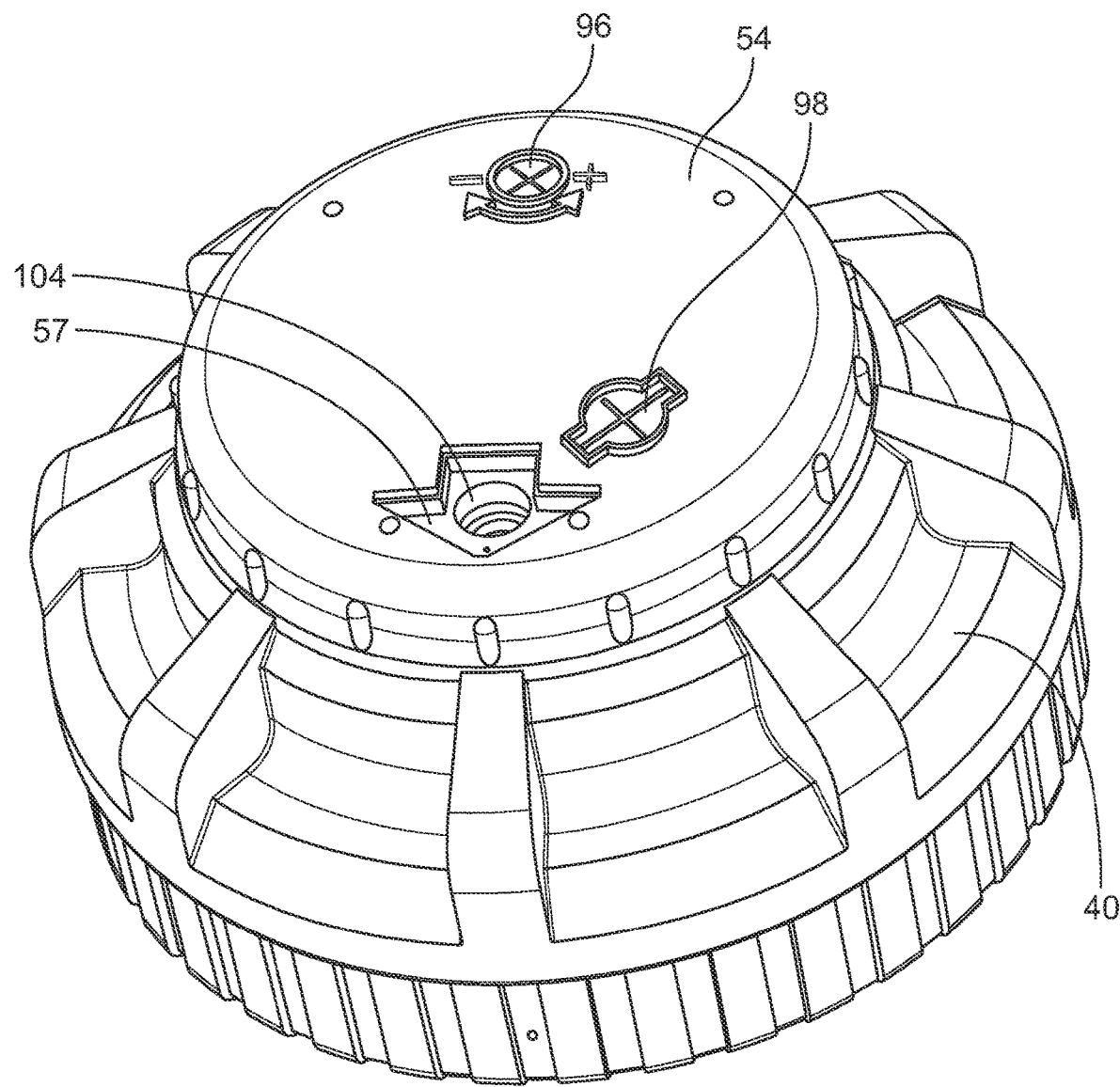
FIG. 9 is a perspective view of the assembled top portion of the rotor of FIG. 1 in the retracted position with the non-potable indicator displayed.

FIGS. 8 and 9 show the top portion of the rotor 10 with the tear-away section 92 removed. As can be seen, when the section 92 is removed, a display area 57 of the insert 55 is exposed or displayed to the user. It is generally contemplated that this portion will include indicia (letters, symbols, color-coding, etc.) indicating that the rotor 10 uses not-potable water. For example, these indicia may include labeling and/or color-coding to indicate that the rotor 10 is intended for use with non-potable water. In this example, when the portion of the insert 55 is exposed, it is labeled with the letters NP, signifying non-potable. Further, in this example, it is generally contemplated that the insert 55 will be a different color than the rotor cover 54. For example, in one form, the insert 55 may be purple while the rotor cover 54 is black so that, when the section 92 is removed, the purple color will indicate that the rotor 10 is a non-potable version.

In other words, the rotor 10 can be in one of two states, as determined by the cover 54. In a first state, the cover 54 is intact and the removable section 92 is not removed such that the insert 55 is not exposed and is hidden from view. This first state of the cover 54 indicates that the irrigation device is intended for use with potable fluid. In a second state, the cover 54 is not intact and the removable section 92 has been removed such that the indicia of the insert 55 are exposed and visible at a display area 57. This second state of the cover 54 indicates that the irrigation device is intended for use with non-potable fluid.

Figure 10:
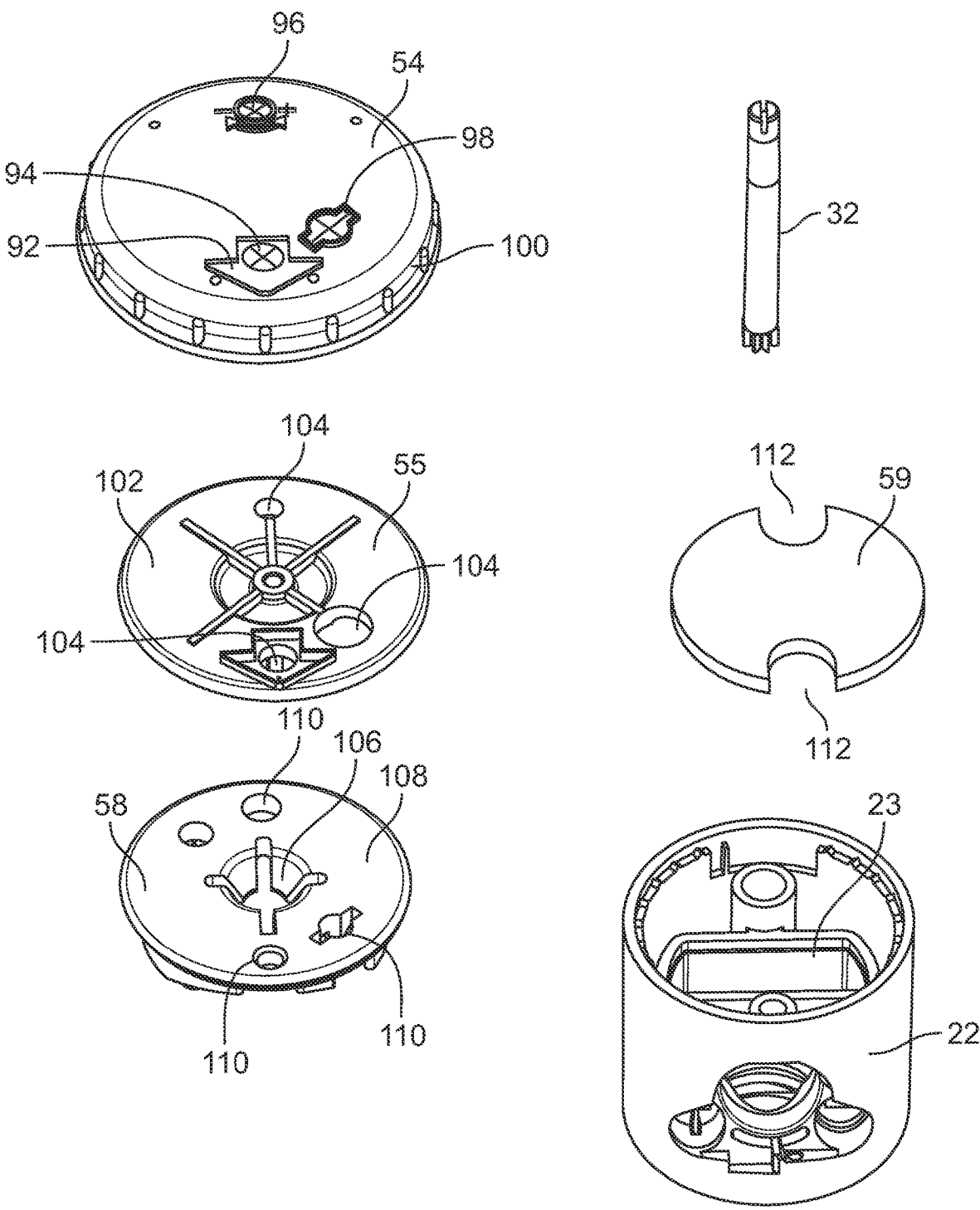
FIG. 10 is a top exploded view of some of the top components of the rotor of FIG. 1.
Figure 11:
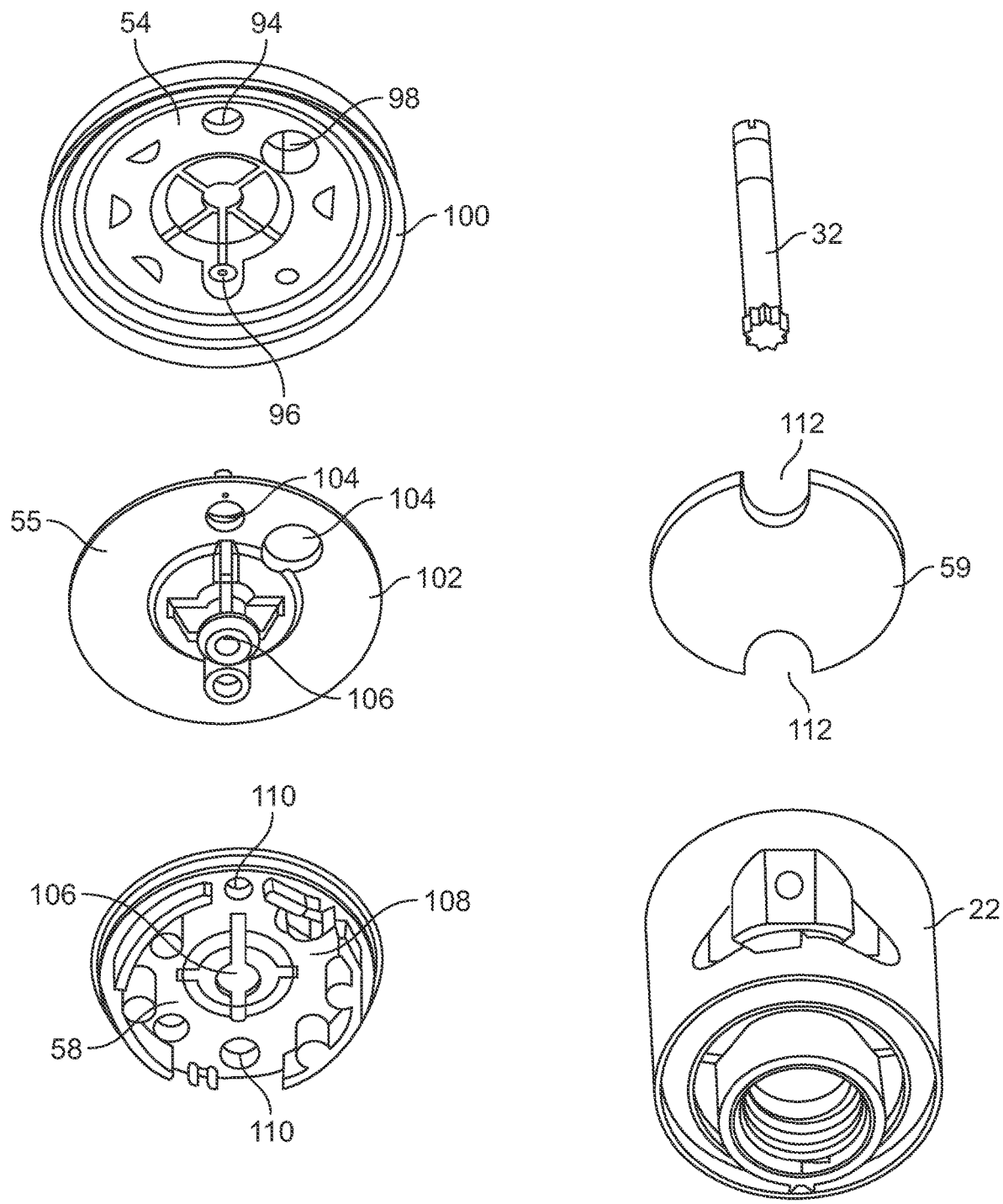
FIG. 11 is a bottom exploded view of the top components of the rotor shown in FIG. 10.
Figure 12:
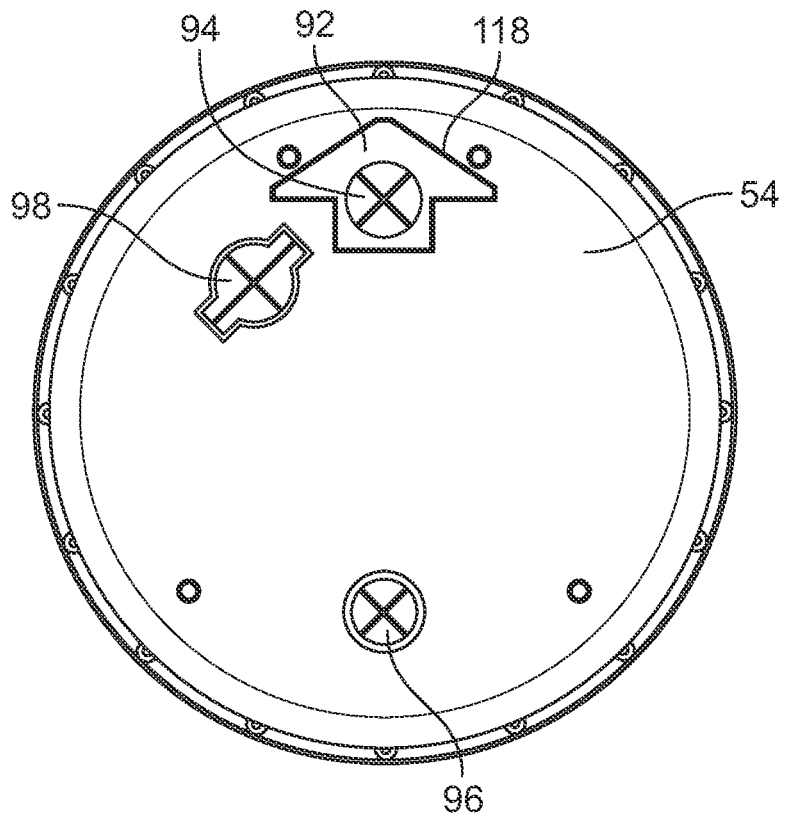
FIG. 12 is a top view of the unassembled rotor cover and the cover insert components of the rotor of FIG. 1 with the non-potable display tab of the rotor cover intact.
Figure 12:
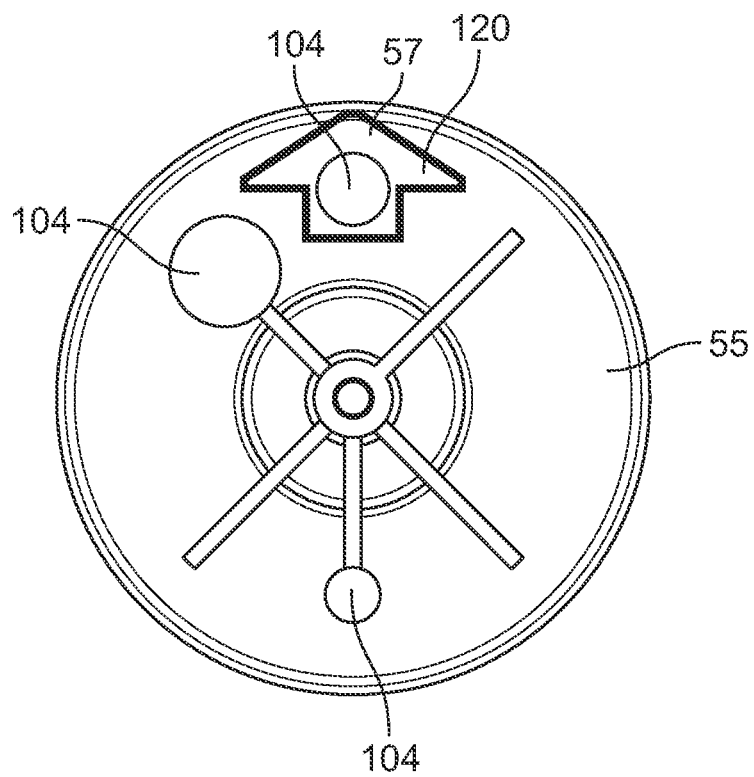
Figure 13:
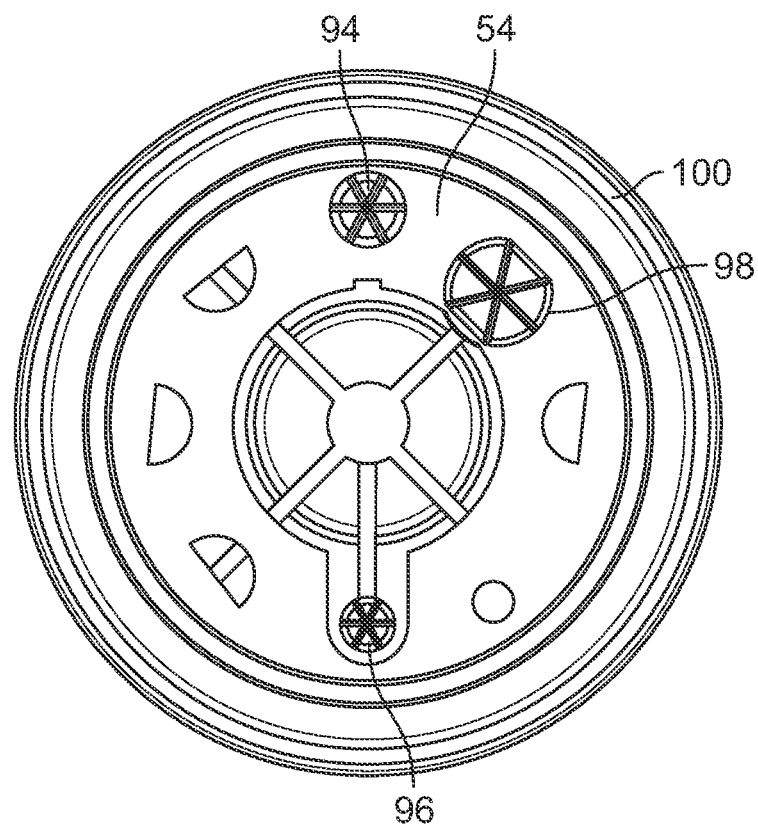
FIG. 13 is a bottom view of the unassembled rotor cover and the cover insert components shown in FIG. 1 with the non-potable display tab of the rotor cover intact.
Figure 13:
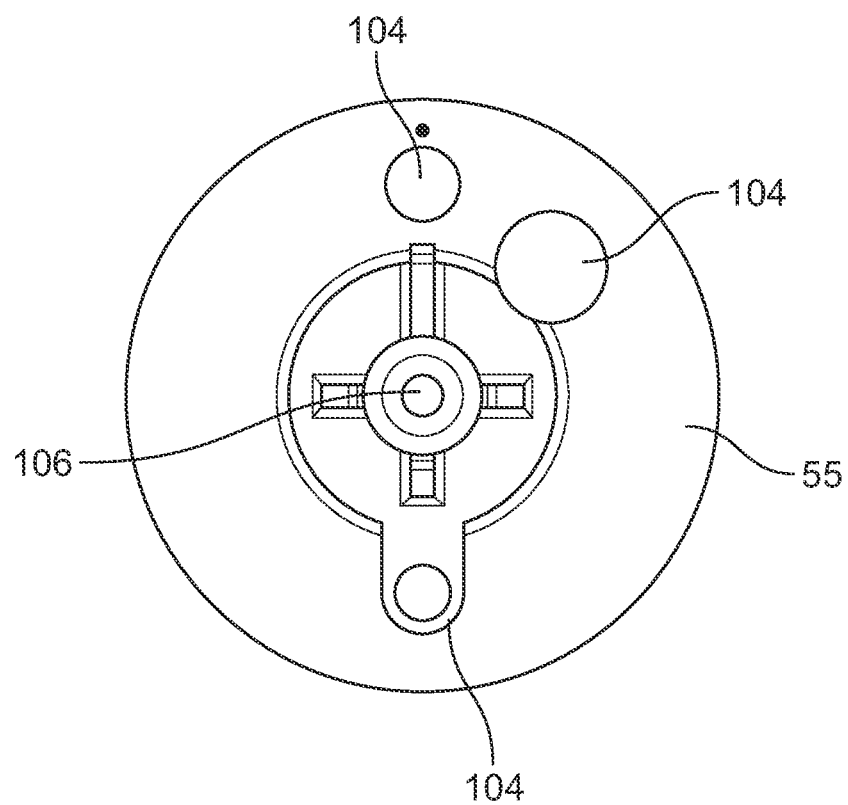

FIGS. 10 and 11 show some of the components of the rotor 10 that form the top of the rotor 10 and/or enclose the turret 22. The rotor cover 54 is preferably formed of a TPE material that is overmolded about the insert (or substrate) 55. The rotor cover 10 is preferably circular in shape and includes an outer circumferential lip 100 that extends downwardly to enclose the other components at the top of the turret 22. Although the tear-away section 92 is shown at one area of the rotor cover 54, it will be understood that the section 92 may be located at any desired area of the rotor cover 54 or could be the entire cover.

The insert 55 is disposed at least partially within the rotor cover 54. The insert 55 is preferably formed of a rigid plastic material (a material that is more rigid than the material of the rotor cover 54). The insert 55 includes a preferably circular plate 102 with openings 104 formed therein to receive screws and/or tools for actuation of various features (as described above). The insert 55 also preferably includes a projection 106 that extends downwardly from plate 102.

The turret cap 58 is disposed beneath the rotor cover 54 and insert 55. It preferably has a central bore 106 for receiving the projection 102 extending downwardly from the insert 55. It also includes a preferably circular plate 108 with openings 110 formed therein to receive screws or members for actuation of various features. A foam insert 59 is disposed beneath the turret cap 58 and includes openings 112 for receiving the arc adjustment member 32 and a radius adjustment screw (not shown), which extend therethrough and into the turret 22.

FIGS. 12-18 show the rotor cover 54 and the insert 55 in various assembled and unassembled conditions. As can be seen from FIGS. 15 and 16 (and FIGS. 4 and 5), the rotor cover 54 includes a top layer 114 and a bottom layer 116 that sandwich the insert 55 therebetween. More specifically, the top layer 114 and bottom layer 116 sandwich a portion of the plate 102 of the insert 55, i.e., a portion of the insert 55 is embedded between the two layers 114, 116. These layers 114, 116 are preferably overmolded about the insert 55. In this manner, the overmolded material is preferably bonded to the insert 55, thereby minimizing the risk of separation of these two materials (which is desirable especially for rotors and other irrigation devices installed in the ground with expected foot traffic).

Further, the arrow-shaped section 92 is preferably raised relative to the top layer 114 (except for the radius adjustment slot 94) to allow this section 92 to be torn away easily. To also help with removal, the rotor cover 54 preferably has a recess 118 or thinner material extending around the perimeter of the removable arrow section 92. At the top and sides of the arrow, the recess 118 preferably stops to provide anchor points 119 for the removable section 92 so that the section 92 has enough strength to not be removed unintentionally. In other words, the design of the removable section 92 is preferably optimized for intentional removal and durability to reduce the likelihood of accidental removal or separation. In other forms, as an alternative to the recess 118, the perimeter may be perforated.

Figure 14:
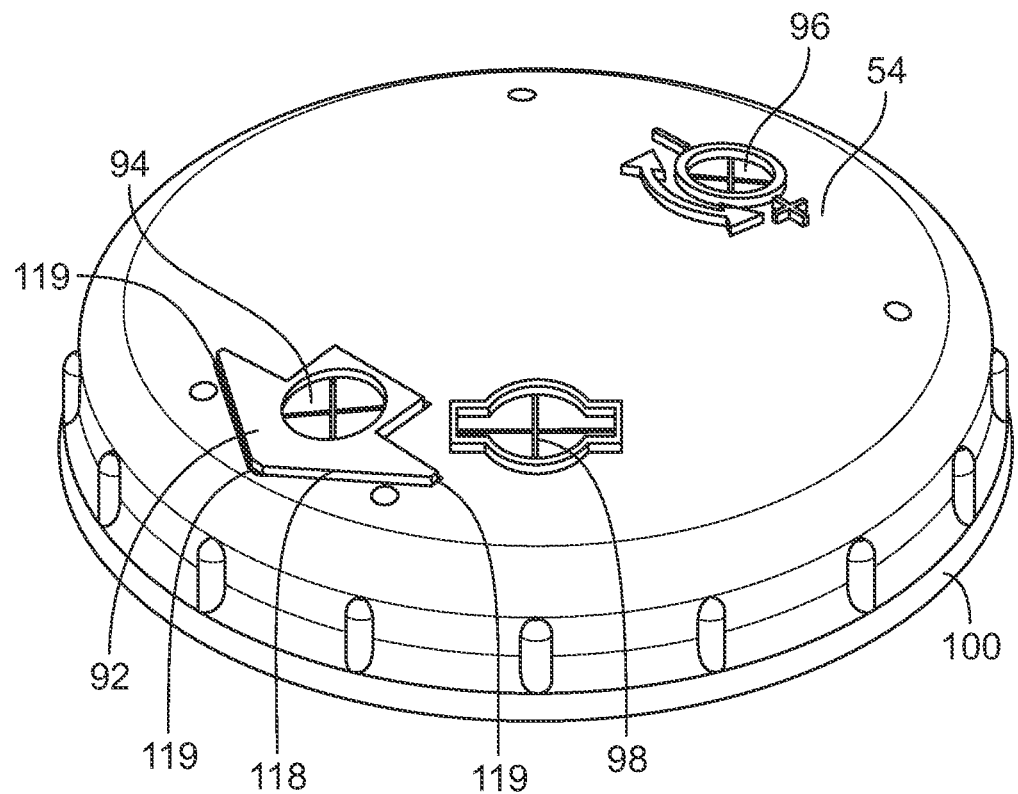
FIG. 14 is a top perspective view of the unassembled rotor cover and the cover insert components shown in FIG. 12 with the non-potable display tab intact.
Figure 14:
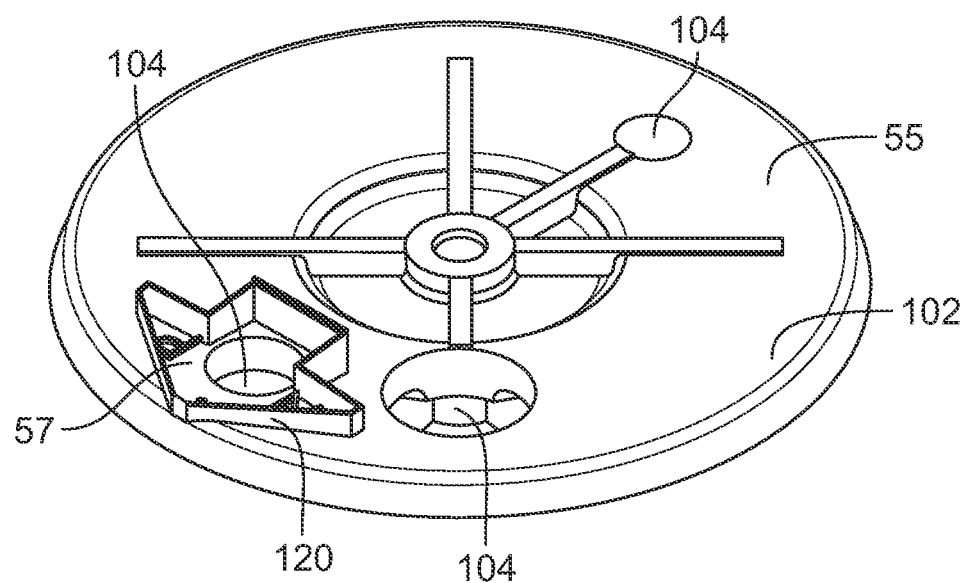
Figure 15:
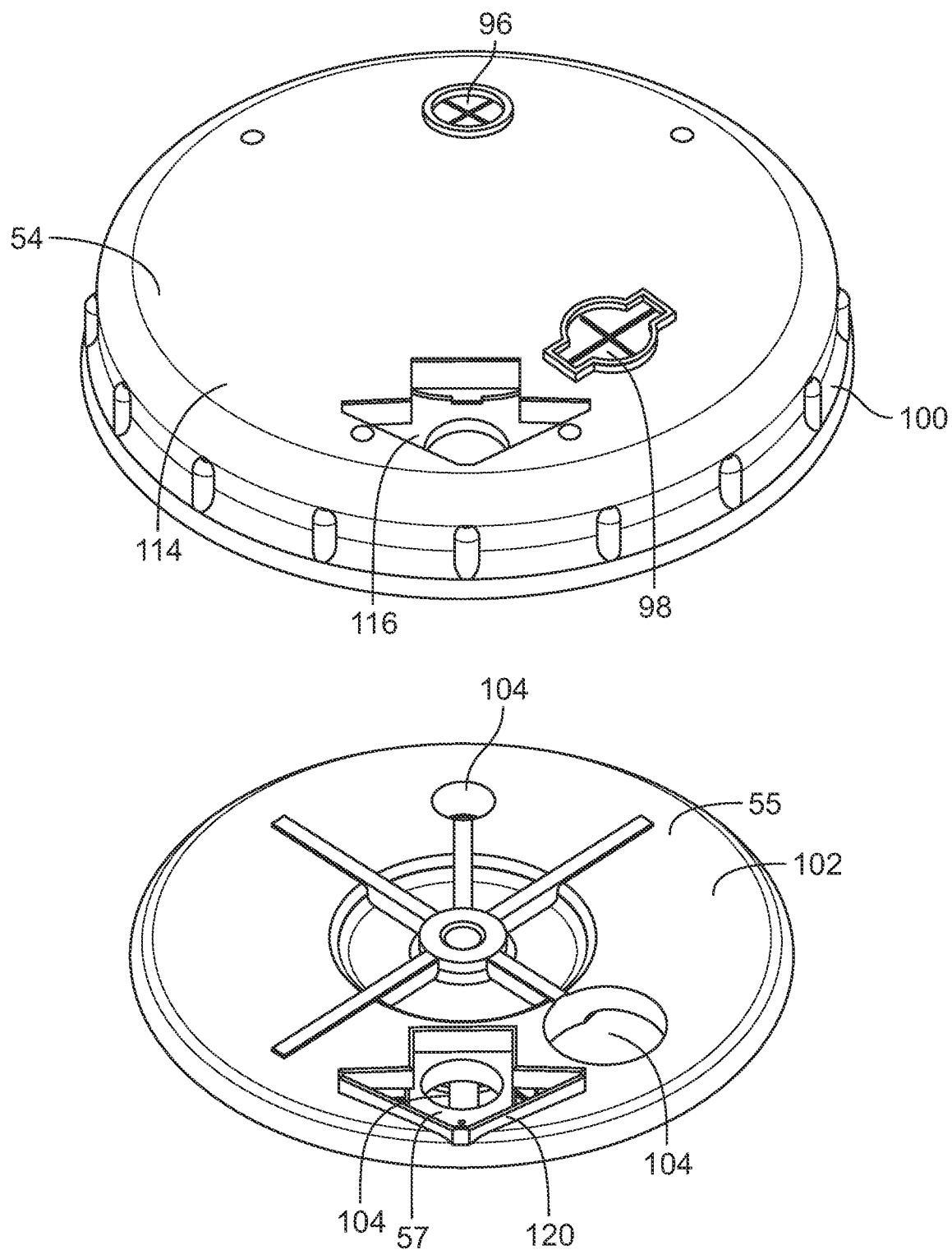
FIG. 15 is a top perspective view of the unassembled rotor cover and the cover insert components shown in FIG. 12 but with the non-potable display tab removed.
Figure 16:
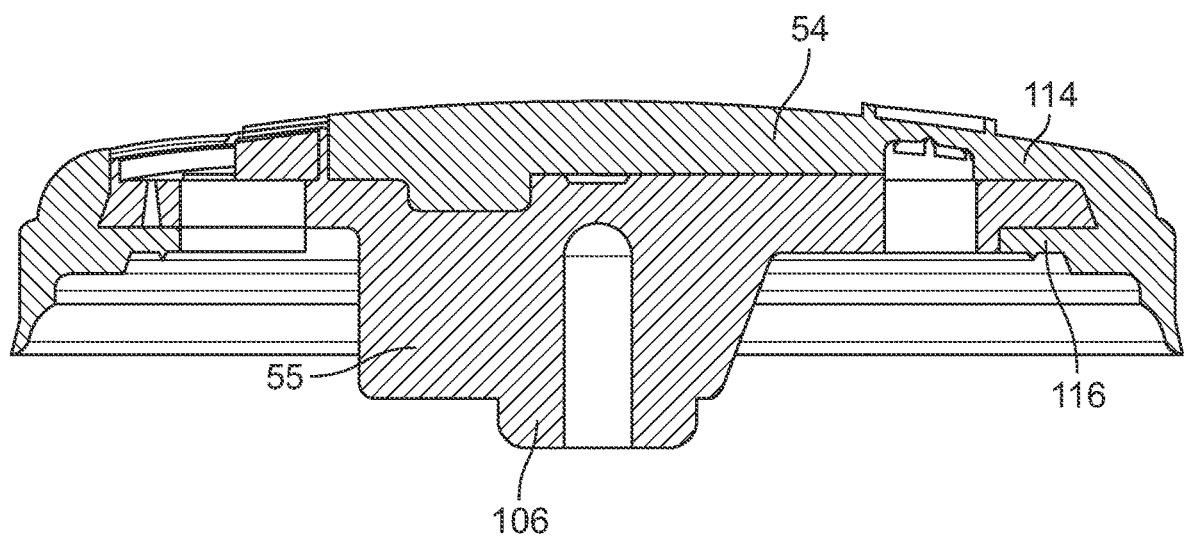
FIG. 16 is a cross-sectional view of the assembled rotor cover and the cover insert components shown in FIG. 12 with the non-potable display tab removed.
Figure 17:
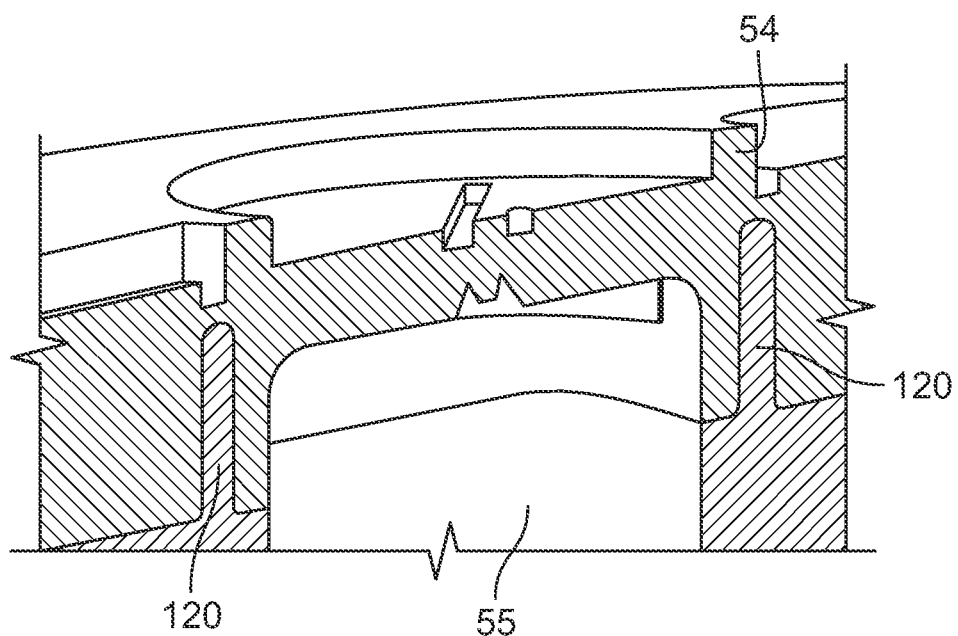
FIG. 17 is a partial cross-sectional view of the assembled rotor cover and the cover insert components shown in FIG. 12.
Figure 18:
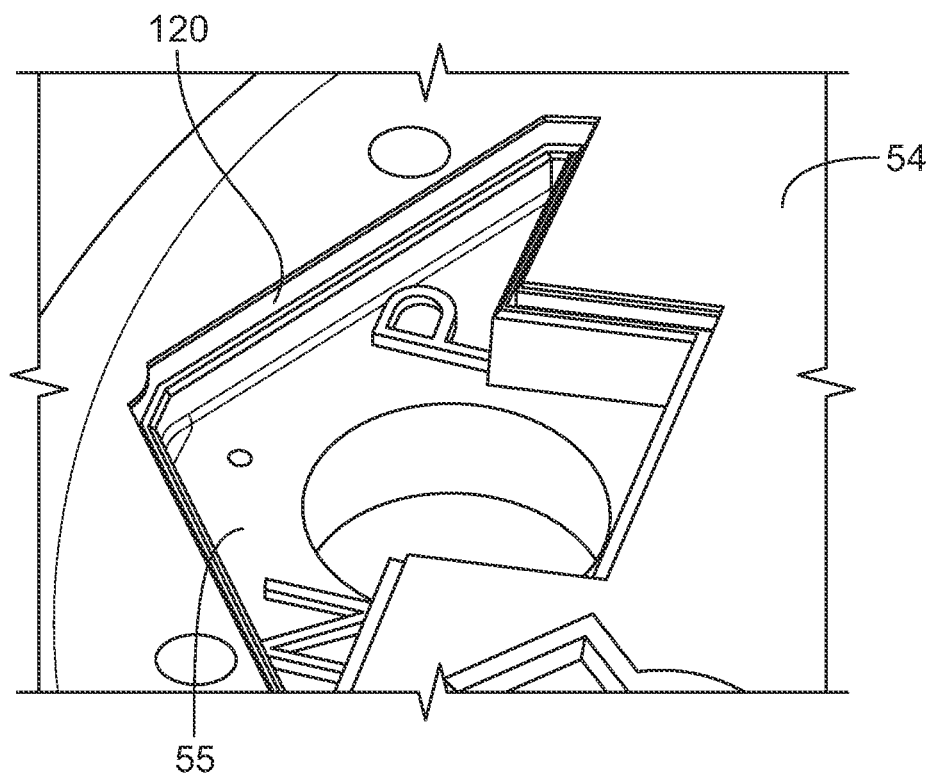
FIG. 18 is a partial top perspective view of the assembled rotor cover and the cover insert components shown in FIG. 12.

As can be seen in FIGS. 14, 17, and 18, the insert 55 preferably includes a raised rim (or rib) 120 that defines the outer boundary of an arrow-shaped area 122 of the insert 55 corresponding to the shape and location of the arrow-shaped section 92 of the rotor cover 54. The rib 120 enables the thin, arrow-shaped section 92 of the rotor cover 54 to be torn away more easily. In one form, the height of the rib 120 is not uniform. Here, in this form, the height of the rib 120 is greatest at the tail of the arrow shape and decreases in height as one proceeds along the sides of the arrow shape to the tip. Further, the top of the rib 120 can be chamfered on one or both sides to help facilitate removal of the tear away section 92. The softer TPE material of the arrow-shaped section 92 is preferably higher than the top of the rib 120 to still provide protection at the top of the rotor 10. In other forms, the rib 120 may be omitted entirely.

In one form, it is contemplated that the insert 55 may be created by injection molding. It may be created in a non-potable purple color from glass-filled polypropylene. The purple colorant may be added to the resin to create the pre-colored insert 55. Then, a TPE material (such as, for example, santoprene) may be overmolded about the insert 55 to create the finished combined part.

Figure 19:
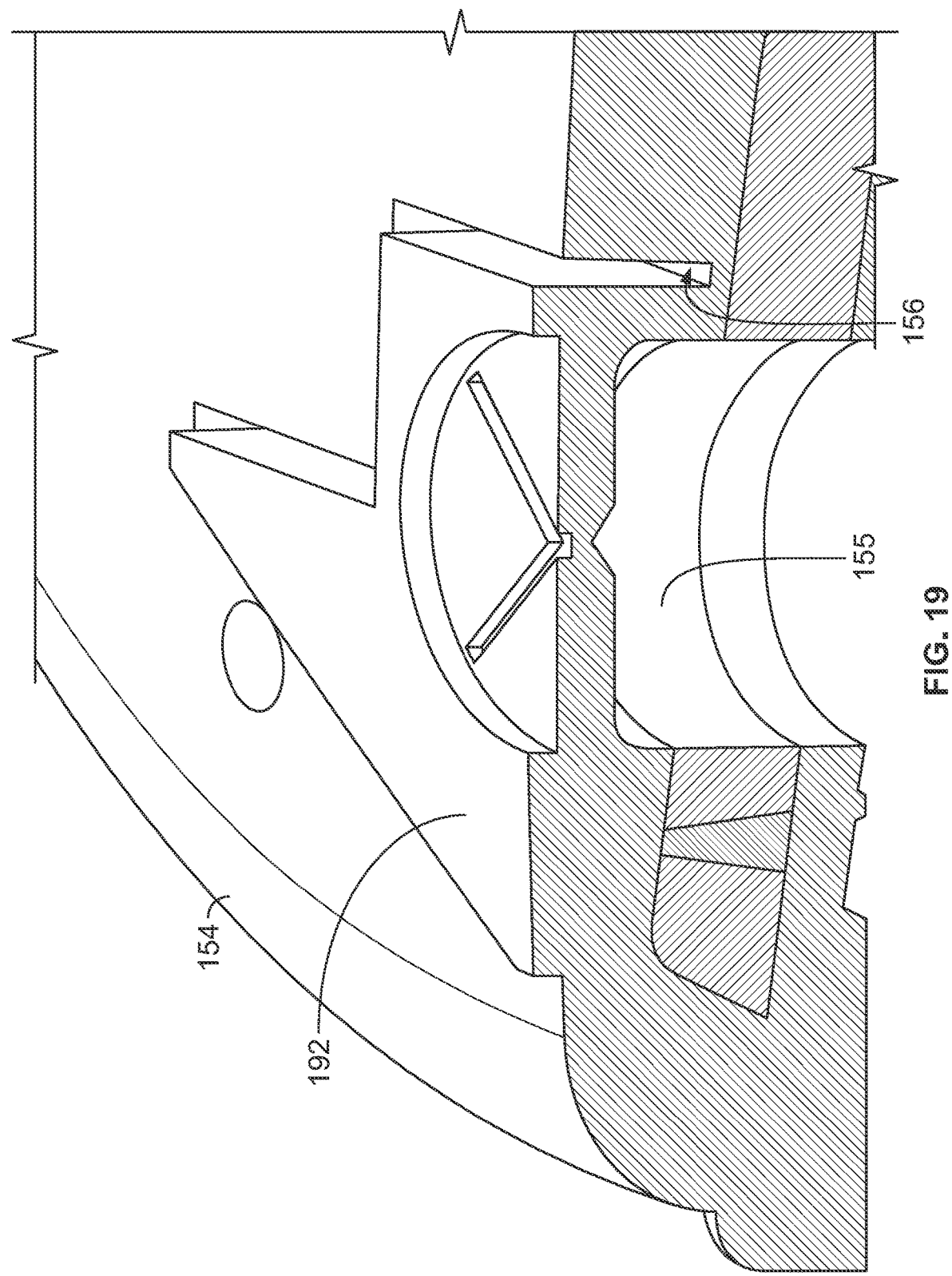
FIG. 19 is a partial cross-sectional view of an alternative rotor cover component and an alternative cover insert component in assembled form.

Alternative embodiments of the rotor cover 154 and the insert 155 are shown in FIG. 19. As can be seen, these alternative embodiments are generally similar to those shown in FIGS. 12-18 (and the above discussion is generally incorporated herein), but in this assembled form, the insert 155 does not have the raised rim 120 (or rib/protrusion) of insert 54. Instead, the depth of the recess in the rotor cover 154 has been increased so as to define a deep slot 156 (which is relatively deep compared to recess 118 of rotor cover 54). These differences can be seen by comparing FIGS. 17 and 19. Thus, in this assembled form, the thin tear away areas are formed with slots 156 around the arrow-shaped tear away section 192 as opposed to the protrusions 120 on insert 55.

It should be understood that the rotor 10 described above is just one example of an irrigation device that may utilize some of the claimed subject matter. It is also contemplated that other types of irrigation devices might also utilize conversion indicators. It is contemplated that other types of irrigation devices may include an insert and a cover overmolded about the insert. The cover may include a tear-away allowing the irrigation device to be converted from a version intended for potable water use to a version intended for non-potable water use (or to indicate conversion involving some other condition). The insert may be labeled and colored appropriately.

It will be understood that various changes in the details, materials, and arrangements of parts and components which have been herein described and illustrated in order to explain the nature of the irrigation devices may be made by those skilled in the art within the principle and scope of the irrigation devices and components thereof, as expressed in the appended claims. Furthermore, while various features have been described with regard to a particular embodiment or a particular approach, it will be appreciated that features described for one embodiment also may be incorporated with the other described embodiments.

What is claimed is:

1. An irrigation device comprising:
   an inlet for receiving pressurized fluid for irrigation;
   an outlet for discharging pressurized fluid from the irrigation device;
   a body defining a flow path from the inlet to the outlet;
   a cover carried by the body and including a removable section and an unremovable section;
   indicia disposed at least in part under the removable section, the indicia indicating information pertaining to a condition of the irrigation device;
   wherein the cover is configured to indicate:
      a first state where the removable section remains intact so that the indicia are covered by the removable section; and
      a second state where the removable section has been separated entirely from the unremovable section so that the indicia are exposed.

2. The irrigation device of claim 1, further comprising an insert embedded at least partially within the cover, the insert displaying the indicia thereon.

3. The irrigation device of claim 2, wherein, in the first state, the removable section is raised, at least in part, with respect to an adjacent portion of the cover.

4. The irrigation device of claim 1, further comprising:
   a recess disposed about a portion of a perimeter of the removable section; and
   one or more anchor points disposed at predetermined points along the perimeter to resist inadvertent separation of the removable section.

5. The irrigation device of claim 2, further comprising:
   an area of the insert with a shape corresponding to a shape of the removable section of the cover;
   a rib disposed about a perimeter of the area and projecting toward the cover.

6. The irrigation device of claim 2, wherein:
   the cover includes at least one slot configured to receive a tool for actuation of at least one control feature of the irrigation device; and
   the insert includes at least one opening configured to receive a member for actuation of the at least one control feature of the irrigation device.

7. The irrigation device of claim 6, wherein the at least one slot of the cover is disposed at the removable section of the cover.

8. The irrigation device of claim 2, wherein the cover is formed of a thermoplastic elastomer (TPE) material and wherein the insert is formed of a plastic material that is more rigid than the TPE material.

9. The irrigation device of claim 1, wherein the condition of the irrigation device is potable or non-potable use and wherein the indicia are at least one of letters indicating non-potable fluid use and color indicating non-potable fluid use.

10. The irrigation device of claim 1, wherein the irrigation device further comprises:
    a housing defining the inlet;
    a riser assembly mounted to the housing;
    a turret defining an interior and being mounted on the riser assembly, the turret defining the outlet for discharging pressurized fluid from the irrigation device; and
    the riser assembly and the turret being moveable between a retracted position and an elevated position relative to the housing.

11. The irrigation device of claim 1, wherein the indicia are fixed relative to the outlet.

12. The irrigation device of claim 1, wherein the removable section comprises a tear-away section that is configured to be torn from the unremovable section.

13. The irrigation device of claim 1, wherein the removable section includes a thinner or perforated portion extending about a perimeter of the removable section to facilitate separation of the removable section from the unremovable section.

14. A conversion indicator for an irrigation device comprising:
    a removable section and an unremovable section of a cover of the irrigation device;
    indicia at least partially covered by the removable section;
    wherein the cover is configured to indicate:
       a first state where the removable section is not separated entirely from the unremovable section, the indicia indicating a first condition of the irrigation device; and
       a second state where the removable section has been separated entirely from the unremovable section so that the indicia are exposed, the indicia indicating a second condition of the irrigation device.

15. The conversion indicator of claim 14, further comprising an insert embedded at least partially within the cover, the insert displaying the indicia thereon.

16. The conversion indicator of claim 15, wherein, in the first state, the removable section is raised, at least in part, with respect to an adjacent portion of the cover.

17. The conversion indicator of claim 14, further comprising:
   a recess disposed about a portion of a perimeter of the removable section; and
   one or more anchor points disposed at predetermined points along the perimeter to resist inadvertent removal of the removable section.

18. The conversion indicator of claim 15, further comprising:
   an area of the insert with a shape corresponding to a shape of the removable section of the cover;
   a rib disposed about a perimeter of the area and projecting toward the cover.

19. The conversion indicator of claim 15, wherein:
   the cover includes at least one slot configured to receive a tool for actuation of at least one control feature of the irrigation device; and
   the insert each includes at least one slot configured to receive a member for actuation of the at least one control feature of the irrigation device.

20. The conversion indicator of claim 19, wherein the at least one slot of the cover is disposed at the removable section of the cover.

21. The conversion indicator of claim 15, wherein the cover is formed of a thermoplastic elastomer (TPE) material and wherein the insert is formed of a plastic material that is more rigid than the TPE material.

22. The conversion indicator of claim 14, wherein the first condition is potable use, the second condition is non-potable use, and the indicia are at least one of letters indicating non-potable fluid use and color indicating non-potable fluid use.

* * * * *

UNITED STATES PATENT AND TRADEMARK OFFICE
CERTIFICATE OF CORRECTION

PATENT NO. : 11,980,140 B2
APPLICATION NO. : 17/669103
DATED : May 14, 2024
INVENTOR(S) : Saul Le-Garcia Rodolfo, Michael A. McAfee and Jeffrey Glenn Johnson It is certified that error appears in the above-identified patent and that said Letters Patent is hereby corrected as shown below:

On the Title Page

Item (54) and in the Specification Column 1 Lines 1-2, In the title, delete "NON-POTABLE CONVERSION INDICATOR AND IRRIGATION DEVICE" and insert -- IRRIGATION DEVICE AND CONVERSION INDICATOR FOR IRRIGATION DEVICE -- therefor.

Signed and Sealed this
Twentieth Day of August, 2024

Katherine Kelly Vidal
*Director of the United States Patent and Trademark Office*